(12) United States Patent
Arbjerg et al.

(10) Patent No.: US 10,953,914 B2
(45) Date of Patent: Mar. 23, 2021

(54) HYDRAULIC STEERING UNIT

(71) Applicant: Danfoss Power Solutions ApS, Nordborg (DK)

(72) Inventors: Niels Arbjerg, Sydals (DK); Charles Anthony Bates, Soenderborg (DK); Poul Ennemark, Soenderborg (DK); Mogens Frederiksen, Sydals (DK); Casper Mikael Olesen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 386 days.

(21) Appl. No.: 15/970,297

(22) Filed: May 3, 2018

(65) Prior Publication Data

US 2018/0319430 A1 Nov. 8, 2018

(30) Foreign Application Priority Data

May 8, 2017 (DE) ...................... 10 2017 109 798.8

(51) Int. Cl.
*B62D 5/065* (2006.01)
*B62D 5/08* (2006.01)

(52) U.S. Cl.
CPC ................ *B62D 5/065* (2013.01); *B62D 5/08* (2013.01)

(58) Field of Classification Search
CPC ............. B62D 5/065; B62D 5/08; B62D 5/06
See application file for complete search history.

(56) References Cited

U.S. PATENT DOCUMENTS 4,412,415 A * 11/1983 Thomsen ............... B62D 5/093
60/384
4,594,936 A * 6/1986 Bacardit ................ B62D 5/083
137/625.24

(Continued)

FOREIGN PATENT DOCUMENTS

| EP | 2127998 A1 * | 12/2009 | ............. B62D 5/093 |
| EP | 2127998 A1 | 12/2009 | |
| EP | 3078571 A1 | 10/2016 | |

OTHER PUBLICATIONS

First Examination Report for Indian Serial No. 201814007447 dated Mar. 6, 2020.

(Continued)

*Primary Examiner* — Thomas E Lazo
(74) *Attorney, Agent, or Firm* — McCormick, Paulding & Huber PLLC

(57) ABSTRACT

A hydraulic steering unit (1) is described, said hydraulic steering unit (1) comprising a supply port arrangement having a pressure port (P) connected to a main flow path (3) and a tank port (T) connected to a tank flow path (4), a working port arrangement having a left working port (L) connected to a left working flow path (5) and a right working port (R) connected to a right working flow path (6), a bridge arrangement (14) of variable orifices having a first left orifice (A2L) connected to the main flow path (3) and to the left working flow path (5), a first right orifice (A2R) connected to the main flow path (3) and to the right working flow path (6), a second left orifice (A3L) connected to the left working flow path (5) and to the tank flow path (4), and a second right orifice (A3R) connected to the right working flow path (6) and to the tank flow path (4). Such a hydraulic steering unit should be operated together with a pressure source of fixed displacements. To this end an idle flow path (15) branches off the main flow path (3), wherein a variable (Continued)

idle orifice (An) is arranged in the idle flow path (15), the idle orifice (An) being open in neutral position and closing out of neutral position.

13 Claims, 2 Drawing Sheets

(56) References Cited

U.S. PATENT DOCUMENTS

| | | | | |
|---|---|---|---|---|
| 4,620,416 A * | 11/1986 | Yip | ........................... | B62D 5/09 137/596.13 |
| 4,676,334 A * | 6/1987 | Nakamura | ............... | B62D 6/00 180/422 |
| 4,771,841 A * | 9/1988 | Uchida | ................... | B62D 6/00 180/422 |
| 4,805,714 A * | 2/1989 | Nakamura | ............... | B62D 5/22 180/423 |
| 4,865,147 A * | 9/1989 | Uchida | ................... | B62D 6/00 180/423 |
| 4,958,493 A * | 9/1990 | Schutten | ................ | B62D 5/097 137/596.13 |
| 5,038,878 A * | 8/1991 | Uchida | ................... | B62D 6/00 180/422 |
| 5,092,418 A * | 3/1992 | Suzuki | ................... | B62D 5/083 137/625.23 |
| 5,253,729 A * | 10/1993 | Suzuki | ................... | B62D 5/083 137/625.23 |
| 5,819,532 A * | 10/1998 | Wang | ........................ | B62D 5/09 60/384 |
| 5,970,708 A * | 10/1999 | Bergmann | ............... | B62D 5/32 60/384 |
| 6,035,760 A * | 3/2000 | Suzuki | ................... | B62D 5/083 91/375 R |
| 6,035,958 A | 3/2000 | Saita et al. | | |
| 7,028,469 B2 * | 4/2006 | Porskrog | ................ | B62D 5/093 60/384 |
| 9,550,521 B2 * | 1/2017 | Andersen | ............... | B62D 5/062 |
| 2014/0374187 A1 * | 12/2014 | Arbjerg | ................... | B62D 5/30 180/441 |
| 2015/0158523 A1 | 6/2015 | Ennemark et al. | | |
| 2016/0332661 A1 * | 11/2016 | Porskrog | ................ | B62D 5/062 |

OTHER PUBLICATIONS

International Search Report for Serial No. PCT/EP2018/060039 dated Apr. 19. 2018.

* cited by examiner

HYDRAULIC STEERING UNIT

CROSS-REFERENCE TO RELATED APPLICATION

This application claims foreign priority benefits under U.S.C. § 119 to German Patent Application No. 10 2017 109 798.8 filed on May 8, 2017, the content of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path.

BACKGROUND

Such a hydraulic steering unit is known, for example, from U.S. Pat. No. 4,676,334.

The variable orifices are arranged in a kind of Wheatstone bridge. One diagonal of the bridge is arranged between the pressure port and the tank port. The other diagonal is arranged between the two working ports. When, for example, a vehicle equipped with such a steering unit should be steered to the left, the first left orifice and the second right orifice are opened. Hydraulic fluid flows from the pressure port through the first left orifice to the left working port and from there to a steering motor connected to the working port arrangement. Hydraulic fluid displaced from the steering motor enters the steering unit at the right working flow path and flows through the second right orifice back to the tank port.

SUMMARY

The object underlying the invention is to use such a hydraulic steering unit together with a fixed displacement pressure port.

This object is solved with a hydraulic steering unit as described at the outset in that an idle flow path branches off the main flow path, wherein a variable idle orifice is arranged in the idle flow path, the idle orifice being open in neutral position and closing out of neutral position.

Such a hydraulic steering unit can be used together with a fixed displacement pressure source. A fixed displacement pressure source permanently supplies hydraulic fluid under a predetermined pressure to the pressure port. The idle orifice now allows the fluid supplied to the pressure port to escape out of the steering unit as long as the steering unit is in neutral position. The neutral position of the steering unit is the position in which no hydraulic fluid is supplied to the working port arrangement. Basically, this leads to a situation in which a vehicle equipped with a steering unit does not change direction. When, however, the steering unit is actuated to change the moving direction of the vehicle equipped with the steering unit the idle orifice is throttled so that the hydraulic fluid from the pressure port can enter the bridge arrangement to be supplied to the working port arrangement in a controlled manner.

In an embodiment of the invention a measuring motor is arranged in one of the working flow paths. The measuring motor is passed by the fluid in one direction when one of the working ports receives the fluid under pressure. The measuring motor is passed by the hydraulic fluid in the opposite direction when the other pressure port is supplied with fluid under pressure. In the last mentioned case the measuring motor is driven by the fluid which is displaced from the steering motor.

In an embodiment of the invention the orifices of the bridge arrangement are neutral open orifices. When the orifices of the bridge arrangement are open in neutral condition of the steering unit, a permanent flow of hydraulic fluid through the bridge arrangement is allowed. The steering unit shows an open-center behavior. The advantage of such an arrangement is that the steering out of the neutral position can be made very precise and fine.

In an embodiment of the invention a variable main orifice is arranged in the main flow path and the idle flow path branches off the main flow path upstream the main orifice. The main orifice can as well be, for example, a neutral open orifice to have a steering unit with an open-center behavior. By adding the main orifice, it is possible to lower the flow around a neutral position of the variable orifices in the bridge arrangement. An outcome of having a lower supply flow entering the bridge arrangement is that the general pressure level inside the bridge arrangement will be lowered and therefore the outer forces acting on the steering unit will have a greater impact on the other parts of the steering unit. Thereby, the self-realignment capabilities are improved.

In an embodiment of the invention a flow through the main orifice combined with a flow through the idle orifice is constant. The flow through the main orifice is influenced as well by the flow through the bridge arrangement. When the pressure of the flow through the main orifice and through the idle orifice is constant, the fixed displacement pressure pump can supply permanently a constant flow of hydraulic fluid to the pressure port.

In an embodiment of the invention the idle orifice is arranged between the pressure port and the tank port. In this way the part of the hydraulic fluid supplied to the pressure port is guided out to the tank.

In an embodiment of the invention the idle orifice is arranged between the pressure port and a power beyond port. In this case the hydraulic fluid not needed by the steering unit can be used for other purposes.

In an embodiment of the invention a pressure relief valve is arranged between the pressure port and the tank port. This is a safety means to prevent too high pressures within the steering unit.

In an embodiment of the invention a tank orifice is arranged in the tank flow path. The tank orifice can be used for creating a back pressure to improve stability. In other words, the pressure in working chambers of a steering motor connected to the working port arrangement can be kept on a rather high level. The tank orifice can be a fixed orifice or a variable orifice. When the tank orifice is a variable orifice, it is also possible to decrease the resistance across the second variable orifice, wherein the right or left second orifice depends on the direction of steering.

In an embodiment of the invention a variable third orifice is arranged in the left working flow path and a variable third right orifice is arranged in the right working flow path. This makes it possible to realize a closed neutral steering unit in an open-center system. The third orifices prevent in a neutral position high pressures in the pressure chambers of a steering motor connected to the working port arrangement. In a neutral position the working flow paths are interrupted so that the hydraulic fluid is trapped in the working flow paths and in the respective pressure chambers of the steering motor. It is, however, possible to open the variable third left orifice and the variable third right orifice faster than the variable first left orifice and the variable first right orifice. The third orifices open as fast as possible.

BRIEF DESCRIPTION OF THE DRAWINGS

Embodiments of the invention will now be described in more detail with reference to the drawing, in which.

In all Figures the same elements are referred to with the same reference numerals.

DETAILED DESCRIPTION

Figure 1:
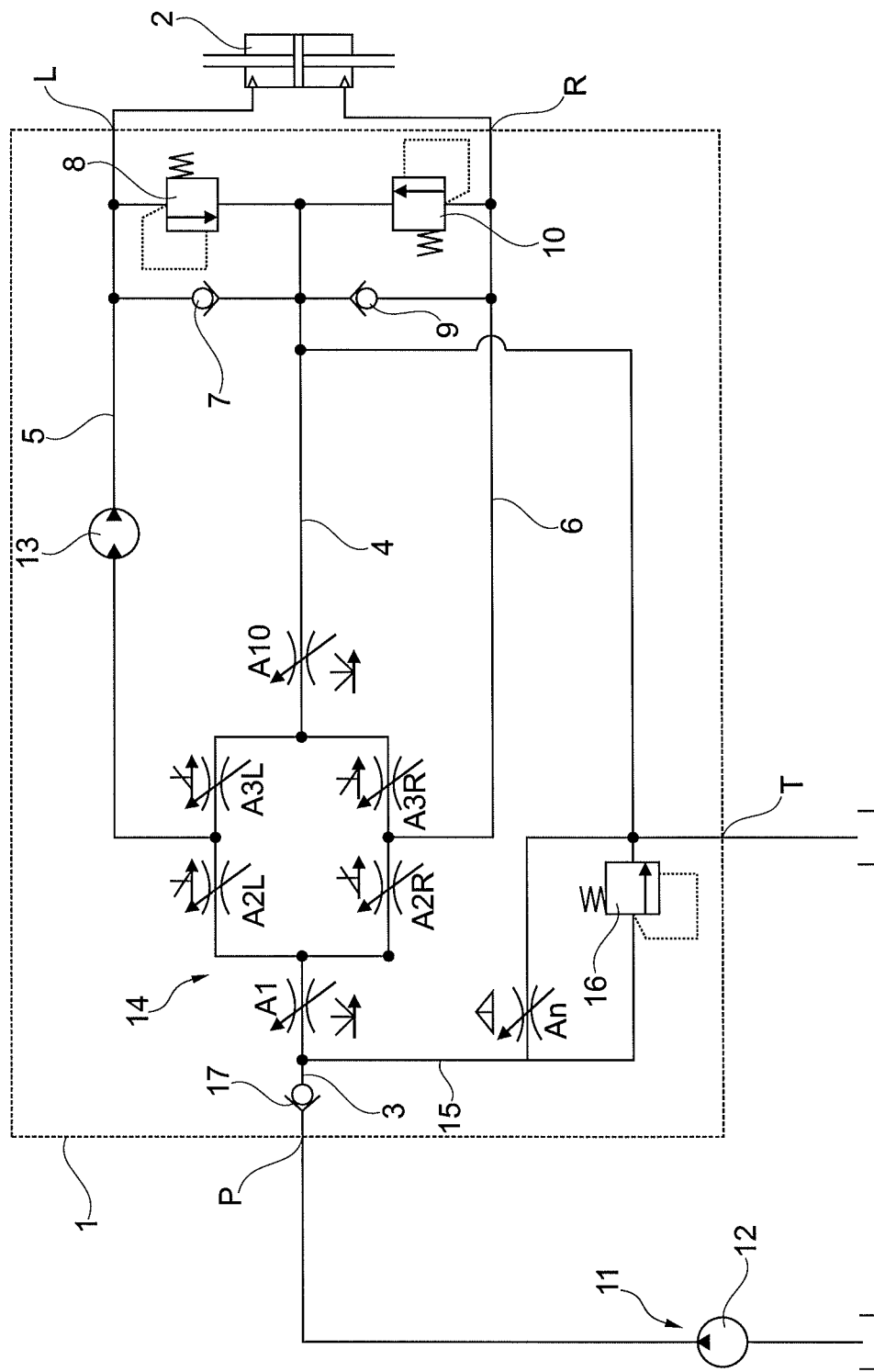
FIG. 1 shows a schematic illustration of a first embodiment of a steering unit.

FIG. 1 shows a hydraulic steering unit 1 comprising a pressure port P and a tank port T. The pressure port P and the tank port T together form a supply port arrangement. Furthermore, the steering unit 1 comprises a left working port L and a right working port R. The left working port L and the right working port R together form a working port arrangement. A steering motor 2 is connected to the working port arrangement.

The pressure port P is connected to a main flow path 3. The tank port T is connected to a tank flow path 4. The left working port L is connected to a left working flow path 5 and the right working port R is connected to a right working flow path 6. The left working flow path 5 and tank flow path 4 are connected by means of a check valve 7 opening in a direction towards the left working flow path 5. Furthermore, the left flow path 5 and the tank flow path 4 are connected by a pressure relief valve 8.

In a similar manner the right working flow path 6 is connected to the tank flow path 4 by means of a check valve 9 opening in a direction towards the right working flow path 6. Furthermore, the right working flow path 6 is connected to the tank flow path 4 by means of a pressure relief valve 10.

The pressure port P is connected to a pressure source 11 having a fixed displacement. The pressure source 11 can be, for example, realized by a fixed displacement pump 12.

A measuring motor 13 is arranged in the left working flow path 5. Alternatively, the measuring motor 13 can be arranged in the right working flow path 6.

A bridge arrangement 14 comprising a number of variable orifices (which will be described later) is arranged between the pressure port P and the tank port T and between the left working port L and the right working port R. In more detail, the bridge arrangement 14 comprises a first left orifice A2L, which is arranged between the main flow path 3 and the left working flow path 5, a first right orifice A2R which is arranged between the main flow path 3 and the right working flow path 6, a second left orifice A3L which is arranged between the left working flow path 5 and the tank flow path 4, and a second right orifice A3R which is arranged between the right working flow path 6 and the tank flow path 4.

As shown with small symbols all four orifices A2L, A3L, A2R, A3R are orifices which are open neutral.

The orifices can be realized, for example, by a spool-sleeve set. In such a spool-sleeve set a spool is rotatably arranged within a sleeve. One of the spool and the sleeve can be rotated relatively to the other of the spool and the sleeve by means of a steering wheel or any other steering command giving means. When, for example, the steering wheel is turned to the left, the first left orifice A2L and the second right orifice A3R are opened and the second left orifice A3L and the first right orifice A2R are closed. Hydraulic fluid from the pressure port P then flows through the first left orifice A2L, through the measuring motor 13, through the left working flow path 5 to the left working port L and from there to the steering motor 2. Hydraulic fluid displaced from the steering motor 2 flows back through the right working port L, the right working flow path 6 and the second right orifice A3R to the tank flow path 4 and from there to the tank port T.

In such a spool-sleeve set the other one of the spool and the sleeve is operatively connected to the measuring motor 13 which is driven by the hydraulic fluid flowing through the left working flow path 5. The measuring motor 13 restores the spool and the sleeve back to their initial position, i.e. to the neutral position. In this way, a quantity of hydraulic fluid corresponding to the steering angle of the steering wheel can be supplied to the steering motor.

As mentioned above, the pressure source 11 is a fixed displacement pressure source, i.e. it supplies permanently a constant flow of hydraulic fluid to the pressure port P.

An idle flow path 15 is connected to the main flow path 3. In the embodiment shown in FIG. 1 the idle flow path 15 is connected to the tank port T via an idle orifice An.

As shown with a symbol above the idle orifice An the idle orifice An is fully open in neutral position of the steering unit 1 and closes when the steering unit 1 is actuated and moves out of the neutral position.

In this way hydraulic fluid not needed to actuate the steering motor 2 can be guided to the tank port T to avoid too high pressures.

Furthermore, a pressure relief valve 16 is arranged in parallel to the idle orifice An. The pressure relief valve 16 defines the maximum pressure allowed at the pressure port P.

Furthermore, a main orifice A1 is arranged in the main flow path 1. As shown by a symbol below the main orifice A1 the main orifice A1 is a neutral open orifice like the orifices A2L, A3L, A2R, A3R of the bridge arrangement 14. The idle flow path 15 branches off the main flow path 3 upstream the main orifice A1. A combined flow through the main orifice A1 and through the idle orifice An is constant. In other words, when the main orifice A1 opens, the idle orifice An closes concurrently.

A check valve 17 is arranged between the pressure port P and the main orifice A1 or the bridge arrangement 14, respectively. The check valve 17 is used for emergency steering purposes when the measuring motor 13 is used as emergency pump when the pressure of the pressure source 11 decreases below an allowed level.

Figure 2:
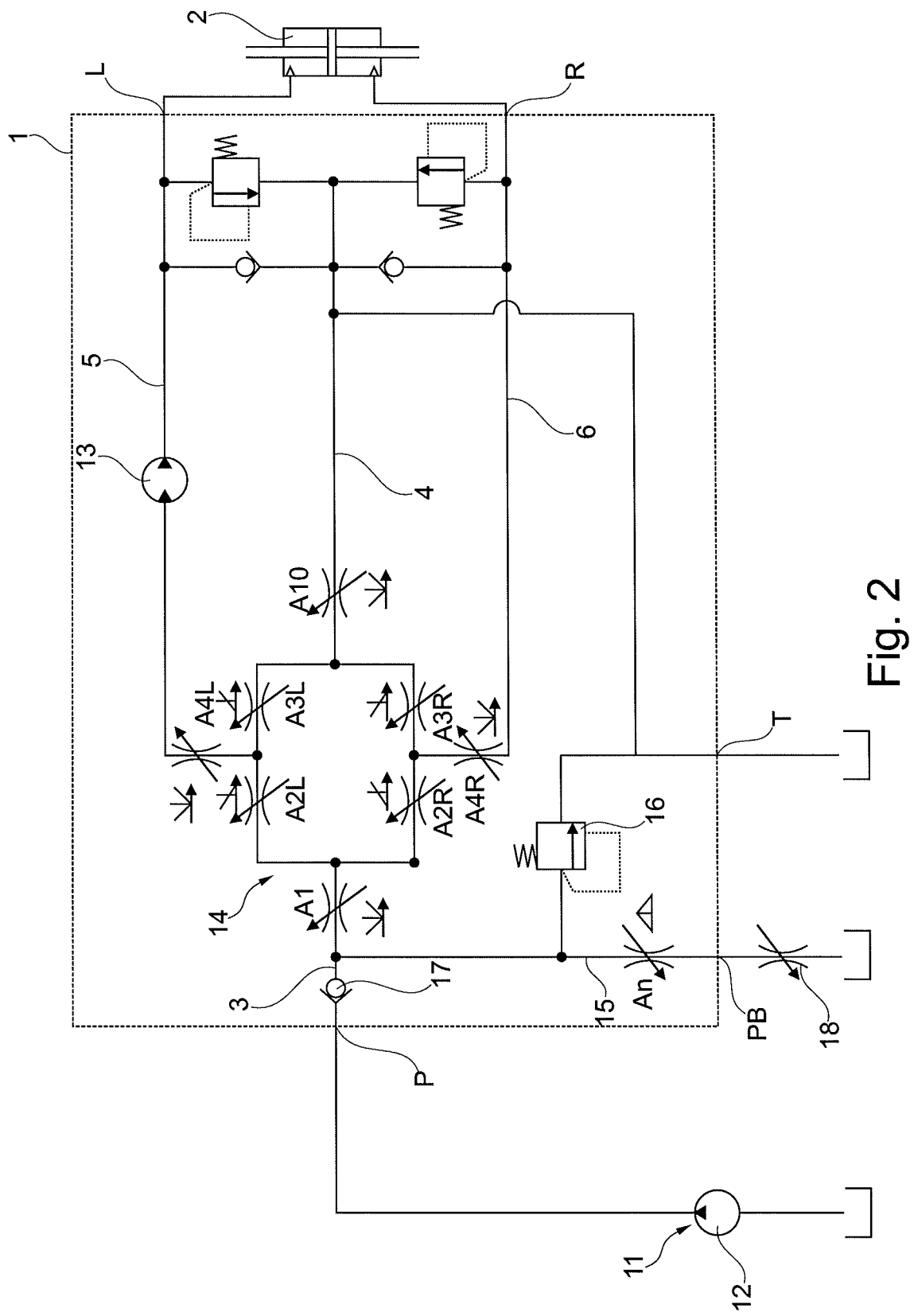
FIG. 2 shows a schematic illustration of a second embodiment of the steering unit.

FIG. 2 shows a slightly amended embodiment of a steering unit 1 in which the idle flow path 15 is connected to a power beyond port PB. In this way the hydraulic fluid under pressure which is not needed for steering purposes can be supplied to another hydraulic consumer 18.

In this case the pressure relief valve 15 is arranged between the idle flow path 15 upstream the idle orifice An and the tank port T.

The main orifice A1 arranged in the main flow path 3 upstream the variable first left orifice A2L and the variable first right orifice A2R is shown as neutral open orifice as well. However, it can also be a closed neutral orifice so that no hydraulic fluid can reach the variable first left orifice A2L and the variable first right orifice A2R when the steering unit 1 is in neutral position.

However, in the embodiment shown the main orifice A1 can allow a small permanent flow. This flow is minimized in the neutral position. An outcome of having a lower supply flow entering the bridge arrangement 14 is that the general pressure level inside the bridge arrangement 14 will be lowered and therefore the outer forces acting on the steering motor 2 will have a greater impact on the steering system, in particular the gear set of the measuring motor 13, thereby improving the self-realignment capabilities.

Furthermore, a tank orifice A10 is arranged in the tank flow path 3. When the tank orifice A10 is a fixed orifice, it can be used for creating a back pressure that is independent on the opening degree of the first and second orifices A2L, A3L, A2R, A3R in their respective flow paths 5, 6. When a spool-sleeve-set is used, the back pressure is independent of the spool-sleeve-angle for improved stability.

It is, however, also possible to use a variable tank orifice A10, as shown in FIG. 1, to decrease the resistance across the variable second orifices A3L, A3R and to improve the emergency steering.

In the embodiment shown in FIG. 2 there is a variable third left orifice A4L arranged in the left working flow path 5 and a variable third right orifice A4R in the right working flow path 6. This allows for the possibility to make a close-neutral set of orifices in an open-center system. In particular, when a spool and a sleeve are used, it is possible to make a closed-neutral spool-sleeve set.

The variable third left orifice A4L and the variable third right orifice A4R open faster than the variable first left orifice A2L and the variable first right orifice A2R. The variable third orifices A4L, A4R are in principle used to cut off the working flow path and to trap the hydraulic fluid in the working flow paths 5, 6 and in the respective pressure chambers of the steering motor 2.

It is, of course, possible to combine main orifice A1, the tank orifice A10 and the third orifices A4L, A4R in all possible combinations. Two combinations are shown in FIGS. 1 and 2. It is, of course, possible to use the third orifices A4L, A4R in the embodiment shown in FIG. 1 as well. Furthermore, it is possible to omit the main orifice A1 and to use only a combination of the tank orifice A10 and the third orifices A4L, A4R. It is also possible to omit the tank orifice A10 and to use only a combination of the main orifice A1 and the third orifices A4L, A4R. Furthermore, it is possible to use only the third orifices A4L, A4R.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path, wherein an idle flow path branches off the main flow path, wherein a variable idle orifice is arranged in the idle flow path, the idle orifice being open in neutral position and closing out of neutral position, wherein a measuring motor is arranged in one of the working flow paths, and wherein the orifices of the bridge arrangement are neutral open orifices.

2. The hydraulic steering unit according to claim 1, wherein a variable main orifice is arranged in the main flow path and the idle flow path branches off the main flow path upstream the main orifice.

3. The hydraulic steering unit according to claim 2, wherein a flow through the main orifice combined with a flow through the idle orifice is constant.

4. The hydraulic steering unit according to claim 3, wherein the idle orifice is arranged between the pressure port and the tank port.

5. The hydraulic steering unit according to claim 2, wherein the idle orifice is arranged between the pressure port and the tank port.

6. The hydraulic steering unit according to claim 2, wherein the idle orifice is arranged between the pressure port and a power beyond port.

7. The hydraulic steering unit according to claim 1, wherein the idle orifice is arranged between the pressure port and the tank port.

8. The hydraulic steering unit according to claim 1, wherein the idle orifice is arranged between the pressure port and a power beyond port.

9. The hydraulic steering unit according to claim 1, wherein a pressure relief valve is arranged between the pressure port and the tank port.

10. The hydraulic steering unit according to claim 1, wherein a tank orifice is arranged in the tank flow path.

11. The hydraulic steering unit according to claim 1, wherein a variable third left orifice is arranged in the left working flow path and a variable third right orifice is arranged in the right working flow path.

12. A hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path, wherein an idle flow path branches off the main flow path, wherein a variable idle orifice is arranged in the idle flow path, the idle orifice being open in neutral position and closing out of neutral position, and wherein the idle orifice is arranged between the pressure port and a power beyond port.

13. A hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path, wherein an idle flow path branches off the main flow path, wherein a variable idle orifice is arranged in the idle flow path, the idle orifice being open in neutral position and closing out of neutral position, and wherein a tank orifice is arranged in the tank flow path.

\* \* \* \* \*